March 24, 1953     Z. CUNNINGHAM     2,632,666

HANDLE

Filed April 20, 1948     2 SHEETS—SHEET 1

INVENTOR.
Zed Cunningham
BY
McMorrow, Berman + Davidson
Attorneys

March 24, 1953　　　Z. CUNNINGHAM　　　2,632,666
HANDLE
Filed April 20, 1948　　　2 SHEETS—SHEET 2
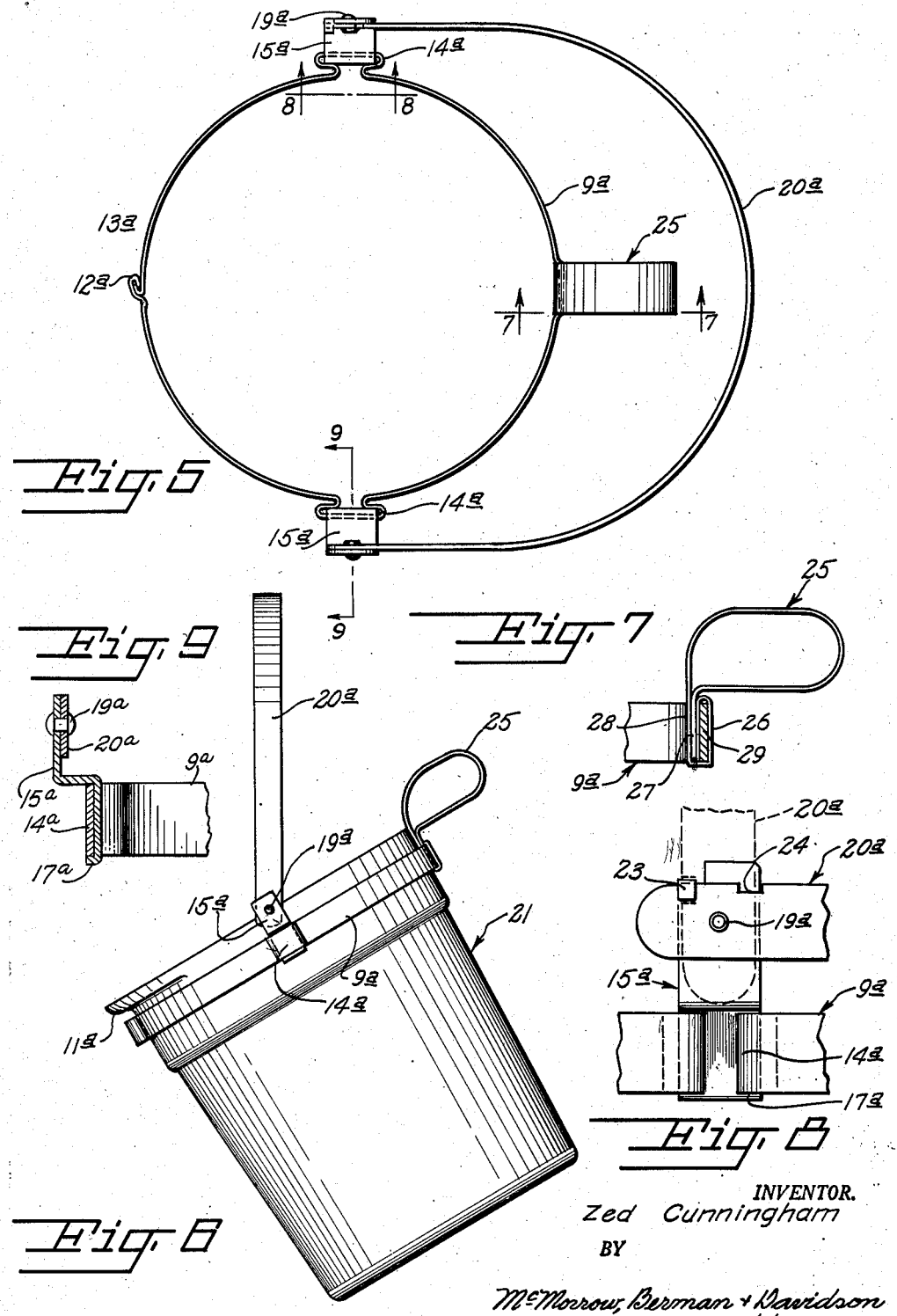
INVENTOR.
Zed Cunningham
BY
McMorrow, Berman + Davidson
Attorneys Patented Mar. 24, 1953

2,632,666

UNITED STATES PATENT OFFICE 2,632,666

HANDLE

Zed Cunningham, Cleveland, Ohio

Application April 20, 1948, Serial No. 22,032

3 Claims. (Cl. 294—31.2)

This invention relates to removable handle for vessels such as Thermos bottles, cooking utensils and the like, and the primary object of the invention is to provide handles which can be easily and quickly installed on and removed from such vessels, whereby such vessels, not ordinarily so equipped, can be conveniently and easily carried, manipulated, and hung up when not being carried or manipulated.

Another important object of the invention is to provide handles of the above indicated character which can be easily and inexpensively manufactured in rugged, serviceable, and attractive form.

Other important objects and advantageous features of the invention will be apparent from the following description and accompanying drawings, wherein, merely for purposes of illustration, two specific embodiments of the invention are set forth in detail.

In the drawings:

Figure 5 is a top plan view of another handle, adapted for use with handleless cooking utensils and the like, showing the bail turned down to one side, and the ends of the band connected.

Figure 6 is a side elevation, showing the same handle applied to a cooking utensil.

Figure 7 is an enlarged fragmentary section taken on the line 7—7 of Figure 5.

Figure 8 is an enlarged fragmentary side elevation showing the manner of connection of the bail with the band and the means for stopping the bail in the horizontal depressed position and in the erect position, and Figure 9 is a transverse vertical section taken on the line 9—9 of Figure 8.

Figure 1:
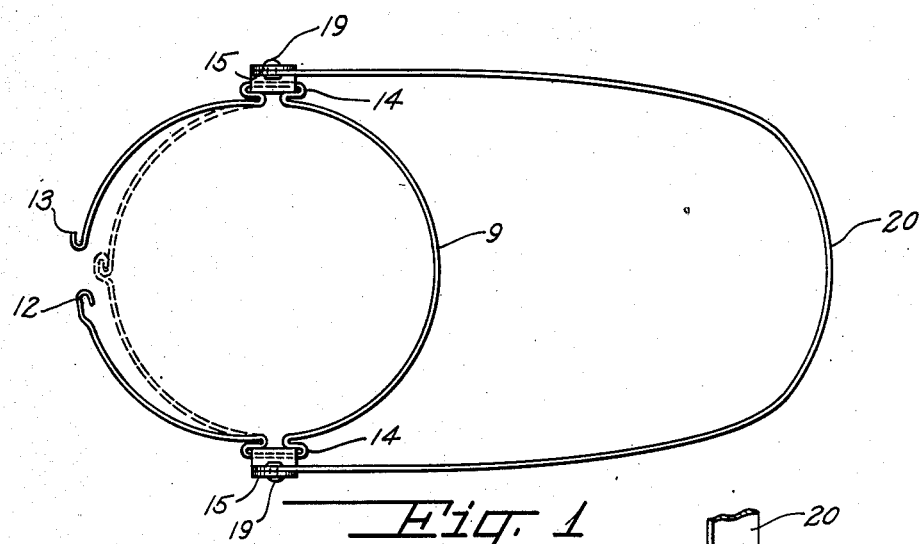
Figure 1 is a top plan view of a handle adapted for use with a Thermos bottle or like vessel, showing the band loosened in full lines and contracted in dotted lines.
Figure 3:
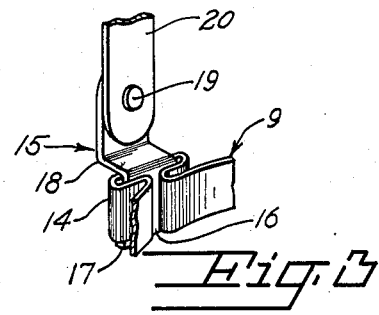
Figure 3 is an enlarged fragmentary perspective view showing the manner of connection of the ends of the bail with the band.
Figure 4:
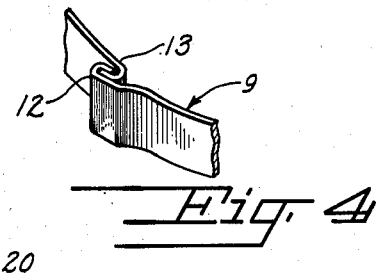
Figure 4 is a similar view showing the manner of detachable connection of the band ends.
Figure 2:
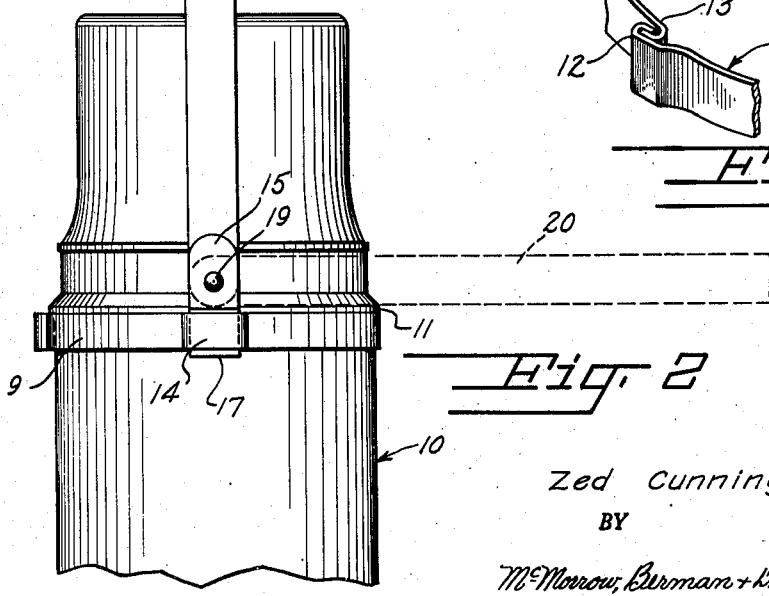
Figure 2 is a side elevation showing the handle applied to a Thermos bottle.

Referring in detail to the drawings, and first to Figures 1 through 4, the handle therein shown comprises a flat strip of metal or other suitable spring material bent into generally circular shape to define an open band 9 of substantially the same diameter as the body of the Thermos bottle 10 below the upper flange 11. The ends of the band 9 normally spring apart when not connected, so as to permit the band to expand and free itself from the bottle so that it is easily removed therefrom. Means for connecting the ends of the band 9 and constricting it around the bottle 10 comprises an outset inwardly directed hook 12 on one end, and an outwardly directed hairpin bend 13 on the other end of the band, the hook 12 being adapted to be snapped over the bend 13 to hold the band tightly constricted around the body of the bottle below the flange 11.

At diametrically opposite sides of the band 9 and at 90 degrees from the band ends, the band is bent to define flattened flap loops or eyes 14 providing receivers for flat bail ears 15 which have lower portions 16 inserted in the eyes with outwardly bent flanges 17 on their lower ends retainably engaging the under edges of the eyes 14, and outwardly outset L-shaped upper portions 18 which retainably rest upon the upper edges of the eyes 14, and cooperate with the flanges 17 in anchoring the bail ears 15 in place in the eyes.

The upper portions of the bail ears are traversed by rivets 19 which constitute pivotal connections for the ends of the handle bail 20 which are positioned at the laterally inward sides of the ears. The bail 20 may be of the same strip stock as the band 9.

The embodiment of the invention shown in Figures 5 through 8, especially suitable for use with cooking utensils, such as a handleless boiler 21, comprises a band 9a, similar to the band 9 of the above described embodiment, for securely encircling the utensil 21 below the upper flange 11a thereof, the ends of the band being connectible by a similar hook 12a and projection 13a. The band 9a is also provided with eyes 14a like the eyes 14, in which are similarly anchored bail ears 15a.

The bail ears 15a differ from the bail ears 15 in that the upper ends of the L-shaped upper portions 18 are modified to provide laterally inwardly projecting, downwardly directed L-shaped stop lugs 23 at the corners on the same side as the ends of the band 9a, which function to engage the then upper edges of the associated ends of the bail 20a, and stop the bail in horizontal position when pivoted on the rivets 19a out of vertical position in a direction away from the band ends. The same edge of the bail ends are notched, as indicated at 24 to engage the adjacent sides of the lugs 23 when the bail 20a is raised from the depressed position or from an intermediate position, such as is exemplified in Figure 6, to the vertical position shown in dotted lines in Figure 8, advantageously slightly past center, whereby the bail is maintained in vertical position.

A hanging loop 25, provided on the band 9a midway between the eyes 14a on the side opposite the band ends, comprises a flat strip bent to provide an elliptical loop positioned above the band, as shown in Figure 7, with one dependent end 26 bent under the lower edge of the band, brought up along the outer side of the band, bent over the upper edge thereof, and downwardly along the inner side of the band. The remaining dependent loop end 27 is inserted and frictionally held between the first flight 28 of the loop end 26 and the final flight 29 of the end 26. The loop 25 is positioned within the ends of an outset portion 30 formed in the band 9a, whereby the loop is prevented from moving along the band.

What is claimed is:

1. In a handle for a cylindrical vessel, a substantially flat circular spring band for encircling the vessel, said band being split to provide normally separated free ends, means on said free ends arranged to be interengaged to releasably lock said band on the vessel, said band being deformed at diametrically opposite points to define flat loops projecting radially outwardly from said band with respect to the center of the band, bail ears having lower portions inserted in said loops, said lower portions having vertically spaced lateral projections retainably engaging the upper and lower edges, respectively, of said loops, said bail ears having upper portions comprising horizontal portions projecting outwardly from said loops and vertical portions rising from the outward ends of said horizontal portions, and a relatively wide aperture bail extending diametrically across said band and having ends pivoted to the inward sides of said vertical portions of said bail ears whereby in depressed horizontal positions of said bail said bail can supportably rest upon said horizontal portions of said bail ears.

2. In a handle for a cylindrical vessel, a substantially circular flat spring band for encircling the vessel and split to provide separable free ends, means on said free ends arranged to be interengaged to releasably constrict said band on the vessel, said band being formed between its ends with a portion radially outwardly offset with respect to the center of the band providing shoulders at its opposite ends, and a hanging element comprising a loop projecting radially outwardly from said band with respect to the center of said band and above the level of said band, said loop having depending end portions engaging said offset portion of the band between said shoulders with at least one of said depending end portions being bent around said offset portion so as to secure said hanging element to said band and prevent movement of said hanging element along said band.

3. A handle for a handleless cylindrical vessel, said handle comprising a flat spring band for encircling the vessel and split to provide separable ends, means on said separable ends arranged to be interengaged to releasably lock said band in constricted relation to the vessel under tension, said band being bent at circumferentially spaced points to provide laterally outwardly projecting substantially C-shaped eyes serving to increase the expansibility of said band and the constrictive tension thereof, bail ears inserted vertically through said eyes and having vertically spaced portions engaging the upper and lower edges of said eyes whereby the bail ears are assembled to said band, and a bail handle extending across said band having its ends pivoted to said bail ears, said bail ears having lateral projections on one side thereof laterally displaced with respect to the pivotal axes of the bail handle ends and under which the bail handle ends are arranged to engage to hold the bail handle horizontally in a plane parallel to said band, said projections being engageable by the bail handle ends in the erect position of said bail handle to hold the bail handle against pivoting out of perpendicular position in one direction.

ZED CUNNINGHAM.

REFERENCES CITED

The following references are of record in the file of this patent:

UNITED STATES PATENTS

| Number | Name | Date |
|---|---|---|
| 334,922 | Alston | Jan. 26, 1886 |
| 911,583 | Focht | Feb. 9, 1909 |
| 1,512,875 | Byam | Oct. 21, 1924 |
| 1,599,278 | Kass | Sept. 7, 1926 |
| 1,698,915 | Kircher | Jan. 15, 1929 |
| 2,249,144 | Kleina | July 15, 1941 |
| 2,537,928 | Churchill | Jan. 9, 1951 |

FOREIGN PATENTS

| Number | Country | Date |
|---|---|---|
| 839,283 | France | Dec. 26, 1938 |